United States Patent [19]

Gray, Jr.

[11] Patent Number: 4,890,635
[45] Date of Patent: Jan. 2, 1990

[54] FIRE CONTROL VALVE

[76] Inventor: Charles H. Gray, Jr., 606 E. X St., Deer Park, Tex. 77536

[21] Appl. No.: 192,640

[22] Filed: May 11, 1988

[51] Int. Cl.$^4$ .............................................. F16K 31/64
[52] U.S. Cl. .......................................... 137/75; 251/74
[58] Field of Search ..................... 251/74; 137/75, 79

[56] References Cited

U.S. PATENT DOCUMENTS

| 422,583 | 3/1890 | Finch | 137/75 |
| 830,719 | 9/1906 | Jenczewsky | 137/75 |
| 1,966,735 | 7/1934 | Sachett | 251/74 X |
| 2,638,106 | 5/1953 | Ghiels | 137/75 |

Primary Examiner—John Fox
Attorney, Agent, or Firm—Fleit, Jacobson, Cohn, Price, Holman & Stern

[57] ABSTRACT

A fire control valve and more particularly a valve installed in the flow line of a flammable or other hazardous flowable material which is normally open but will be automatically closed to interrupt the flow of flammable or hazardous material to a discharge point in the event of a hazardous condition occurring. The valve is held in an open position by a fusible link which retains a spring biased pin in engagement with a spring biased valve stem to retain the valve in open position. The fusible link will melt when subjected to predetermined conditions such as a high temperature condition which occurs in the event of a fire thereby releasing the pin and valve for movement to a closed position for stopping flow of flammable material in order to control the fire or other hazardous condition.

2 Claims, 1 Drawing Sheet

U.S. Patent  Jan. 2, 1990  4,890,635
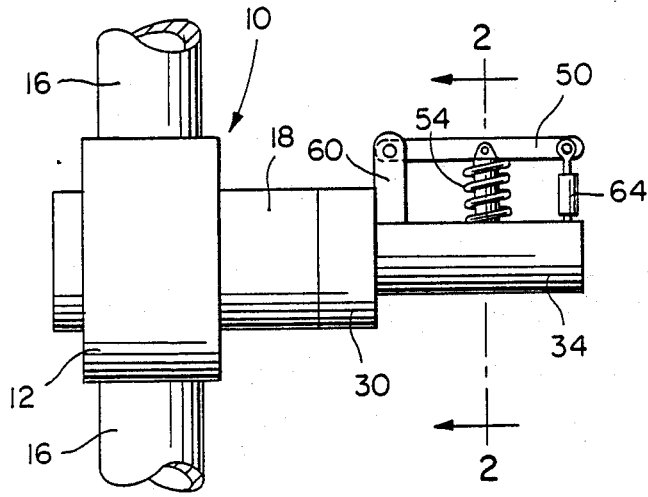
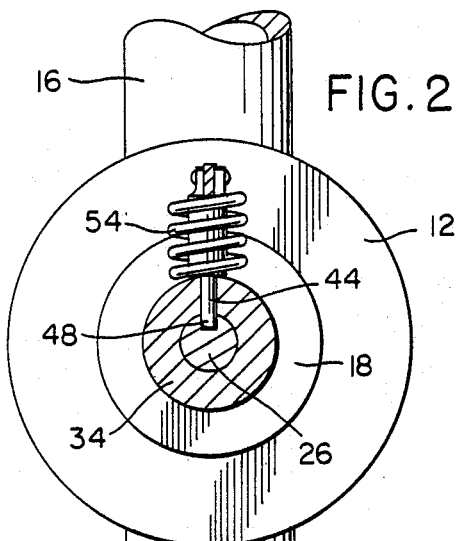
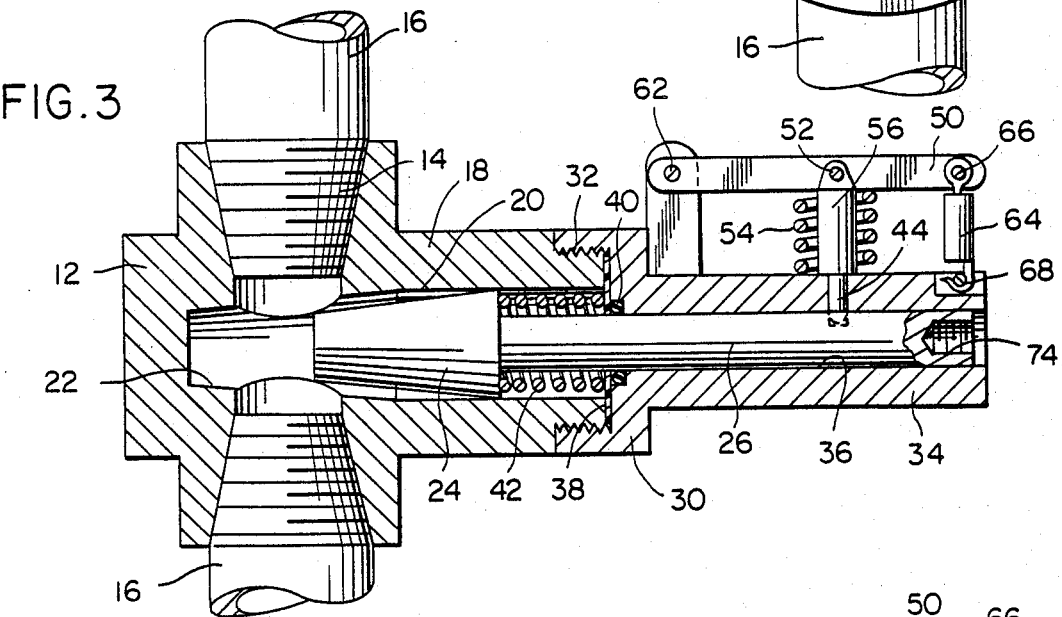
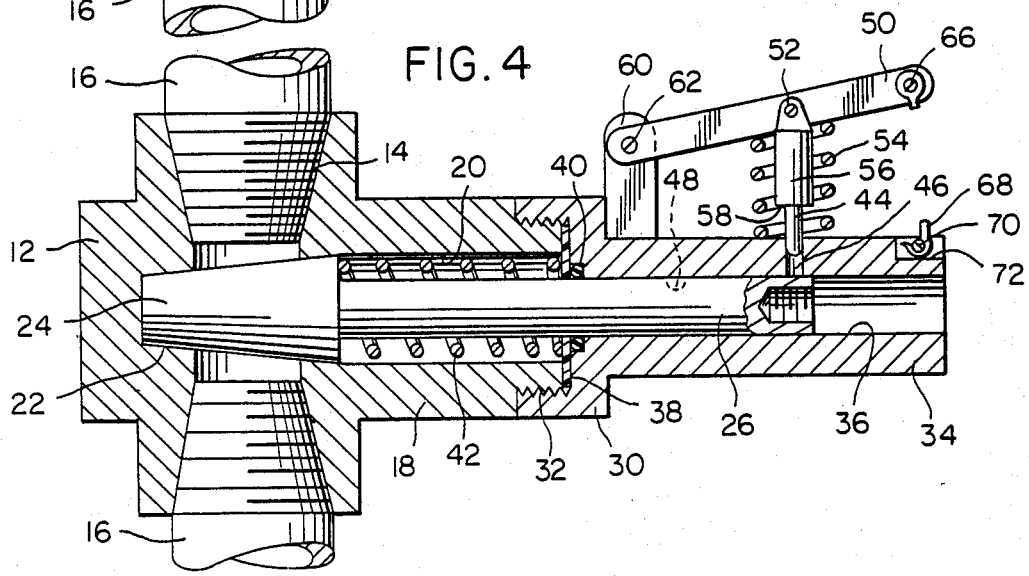

FIRE CONTROL VALVE

BACKGROUND OF THE INVENTION

1. Field of the Invention

The present invention generally relates to a fire control valve and more particularly a valve installed in the flow line of a flammable or other hazardous flowable material which is normally open but will be automatically closed to interrupt the flow of flammable or hazardous material to a discharge point in the event of a hazardous condition occurring. The valve is held in an open position by a fusible link which retains a spring biased pin in engagement with a spring biased valve stem to retain the valve in open position. The fusible link will melt when subjected to predetermined conditions such as a high temperature condition which occurs in the event of a fire thereby releasing the pin and valve for movement to a closed position for stopping flow of flammable material in order to control the fire or other hazardous condition.

2. Information Disclosure Statement

Automatically operated valves are well known in various flow lines with such valves being moved from one position to another in response to various ambient conditions. Included in such valves are valves which are located in water supply lines associated with sprinklers or the like so that the valves will b automatically opened to discharge water from a plurality of sprinkler heads in the event of the ambient temperature becoming elevated above a certain unsafe level. However, the prior art does not include a structure equivalent to the structure of this invention.

SUMMARY OF THE INVENTION

An object of the present invention is to provide a fire control valve that can be quickly and easily installed in a supply line or flow line for flammable material with the valve being retained in open position by a fusible or meltable link which releasably maintains a spring biased pin in engagement with the stem of a spring biased valve to retain the spring biased valve in open position until the fusible link is ruptured due to elevated heat conditions such as may occur during a fire with rupture of the fusible link enabling the spring biased valve to move to a closed position to interrupt or stop the flow of flammable material to the site of a fire.

Another object of the invention is to provide a fire control valve in accordance with the preceding object in which the valve includes a valve plug and stem that is spring biased to a closed position with the valve body including a flow passage therethrough and a generally frustoconical valve seat to receive the imperforate frustoconical plug when in closed position.

A further object of the invention is to provide a fire control valve in accordance with the preceding objects in which the spring loaded pin is engaged with a recess in the stem of the valve with the outer end of the pin extending outwardly from a housing and being connected to a pivot arm pivotally supported from the housing at one end and connected to the housing at the other end by the meltable or fusible link or trigger.

Still another object of the invention is to provide a fire control valve in accordance with the preceding objects which is easy to install, dependable in use, easy to reset after being triggered and effective for controlling the flow of flammable material such as gasoline to the site of a fire.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view of the fire control valve of the present invention illustrating the valve installed in a flow line.

FIG. 2 is a transverse, sectional view taken substantially upon a plane passing along section line 2—2 on FIG. 1 illustrating the specific structural details of the valve stem and spring loaded pin engaged with a recess in the valve stem for retaining the valve in open position.

FIG. 3 is a longitudinal, sectional view of the valve of the present invention illustrating the structure of the components when in open position.

FIG. 4 is a sectional view similar to FIG. 3 but illustrating the valve in closed position.

DESCRIPTION OF THE PREFERRED EMBODIMENT

The fire control valve of the present invention is generally designated by the reference numeral 10 and includes a body 12 having oppositely disposed screw threaded openings 14 to receive the threaded ends of a flow pipe or supply pipe 16 used to convey gasoline or other flammable gases, liquids or other material from a point of supply to a point of use or discharge. While a screw threaded connection has been illustrated, it is pointed out that various types of connecting arrangements may be provided for effectively connecting the valve body 12 to the pipes or conduits 16.

The valve body 12 includes a lateral extension 18 having a hollow interior bore 20 that communicates with a tapered or frustoconical valve seat 22 in the body 12 so that fluid can flow through the valve body 12 from one pipe 16 to the other.

Reciprocally mounted in the valve body 12 is a valve plug 24 provided with a valve stem 26 extending axially from the valve plug 24. The valve plug 24 is of frustoconical or tapered configuration corresponding with the configuration of the valve seat 22 so that when the valve plug 24 is completely received in the valve seat 22, the flow path from one pipe 16 to the other pipe 16 is closed as illustrated in FIG. 4. However, as long as the valve plug 24 is retracted into the bore 20, the flow path remains open.

The outer end of the bore 20 is closed by a closure end cap 30 screw threaded onto the reduced end of the extension 18 by a screw threaded connection 32. The cap 30 includes a longitudinal extension 34 of less diameter than the cap 30 with the extension 34 including a bore or passageway 36 in alignment with the center of the bore 20 to receive the valve stem 26 in a manner to enable it to reciprocate between its open position illustrated in FIG. 3 and its closed position illustrated in FIG. 4.

A gasket 38 is interposed between the reduced end of the extension 18 and the inner axial surface of the cap 30 to seal the threaded connection 32. Also, an O-ring seal 40 encircles the stem 26 immediately outwardly of the gasket 38. A coil compression spring 42 is oriented in the bore 20 with one engaging the larger end of the valve plug 24 and the other end engaging the gasket 38 which is backed by the end cap 30 thus spring biasing the valve plug 24 toward a closed position.

The valve plug 24 and valve stem 26 are retained in retracted and open position by a pin 44 that is radially disposed in a radial bore 46 in the extension 34 with the inner end of the pin 44 being received in a socket or recess 48 in the outer surface of the valve stem 26. The outer end of the pin 44 is connected to the central portion of an elongated arm 50 which generally parallels the extension 34. A pivot pin or other removable fastening device 52 connects the outer end of the pin 44 with the link 50. A coil compression spring 54 encircles the pin with one end engaging the exterior surface of the extension 34 and the other end engaging the inner surface of the pivot arm 50. The pin 44 includes an enlarged outer end portion 56 which defines a shoulder 58 which limits the insertion of the pin 44 into the recess or socket 48 in the valve stem 26.

One end of the pivot arm 50 is pivotally connected to upstanding lugs or brackets 60 rigidly affixed to the exterior of the extension 34 against the cap 30 with a pivot pin 62 connecting the pivot arm 50 to the lugs or brackets 60. The other end of the pivot arm 50 is connected to a fusible link 64 by a pivot pin or bolt 66. The other end of the fusible link 64 is provided with a hook-like structure 68 that is hooked under a transverse pin 70 positioned in a recess 72 at the end of the extension 34 remote from the cap 30 as illustrated in FIGS. 3 and 4. The fusible link 64 serves as a meltable triggering device subject to rupture under high temperature conditions such as would occur in the event of a fire in the area of the fusible link 64. When the fusible link 64 is ruptured, as illustrated in FIG. 4, the spring 54 pivots the pivot arm 50 outwardly about pivot pin 62 and retracts the pin 44 from the notch or recess 48 in the valve stem 26. Either or both of the pivot pins 52 and 62 may be received in slot-like structures to provide radial reciprocal movement of the pin 54 in relation to the radial bore 46 in the extension 34. The spring 42 will slam the valve plug 24 to its fully closed position immediately upon release of the pin 44 from engagement with the recess or notch 48 in the valve stem 26.

In order to reset the valve 10, the outer end of the valve stem 26 is provided with an internally threaded socket 74 which can releasably receive a threaded rod in order to move the valve stem and plug outwardly by compressing the spring 42. It is necessary to also replace the fusible link 64 by connecting it to the pivot arm 50 by use of the pivot pin or bolt 66 and then engaging the hook end 68 under the transverse rod or pin 70 in the radial and longitudinal recess 72 which communicates with the end of the extension 34 thus enabling the hook 68 on a new fusible link 64 to be engaged with the pin 70. The pivot pin or bolt 66 is removable to facilitate replacement of the fusible link 64.

The fusible link may be constructed of various materials including metal alloys having known melting points thereby enabling the temperature at which the fusible link triggers closing of the valve to be selected depending upon the installation requirements. A fire in the locality of the valve will melt the link 64 thus releasing the spring loaded pin and the spring loaded valve plug to enable the spring loaded valve plug to be closed rapidly thus shutting off flow of flammable material to the site of the fire. This valve is especially useful in gas lines in homes, such as gas lines which supply furnaces, stoves, space heaters, water heaters and the like with gas. Also, the valve may be used with various types of storage tanks such as liquid petroleum storage tanks, gasoline storage tanks and the like and in association with any type of flammable material or other hazardous material in which a fire or other dangerous condition exists which elevates temperature.

The valve is quite easily installed since all of the components are self-contained and in the event of the valve being closed, it can be easily reset by replacing the fusible link and retracting the valve stem. The valve will effectively perform its primary function of shutting off the flow or isolating a quantity of flammable material in the event of a fire. The specific shape and configuration of the components renders the entire device relatively small and compact to facilitate manufacture, storage, handling, installation, repair and resetting.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A fire control valve comprising a valve body having a flow passage therethrough and adapted to be connected to a flow line through which flammable material flows, said valve body including a valve seat extending perpendicular to said flow passage, a valve member including a valve plug selectively engageable with the seat and forming a closure for the flow path when engaged with the seat, spring means biasing the valve plug into engagement with the valve seat, means releasably retaining the valve member in a position with the valve plug in a position to enable flow through the flow path, and temperature responsive means disabling the means retaining the valve member in flow enabling position to automatically release the valve member to move to a flow interrupting position in the event of temperature conditions exceeding a predetermined temperature, said valve body including a lateral extension having a bore provided with an open outer end reciprocally receiving the valve member, said means biasing the valve member including a coil spring engaged with the valve plug and extension and biasing the valve plug towards engagement with the valve seat, said valve member including an elongated valve stem having a diameter substantially less than the diameter of the larger end of the valve plug to form a shoulder engaged by said coil spring, said stem extending outwardly in the bore in the lateral extension, seal means in the bore in the lateral extension in sealing engagement with the valve stem to prevent leakage of material past the valve stem, said temperature responsive means including a fusible link having one end connected to the outer end of the lateral extension, said means retaining the valve member in flow enabling position including a spring biased pin biased into disengagement with the valve stem, said valve stem including a lateral socket receiving the inner end of the pin, a coil spring encircling the pin outwardly of the extension with one end of the spring engaging the outer surface of the extension, a pivot arm connected to the extension at one end, connected to the pin at a central portion thereof and connected to the fusible link at the other end thereof to hold the pin in engagement with the valve stem and release the pin when the fusible link is ruptured by high temperature conditions, said coil spring around the pin having its outer end engaged with said pivot arm to bias said pin outwardly to retract the pin from the socket when the fusible link is ruptured.

2. The structure as defined in claim 1 wherein said valve stem includes an end portion exposed to the outer end of the extension and including means to enable resetting of the valve member, said fusible link including means detachably connecting it to the pivot arm and extension for easy replacement.

* * * * *